US008660139B2

(12) United States Patent
Ruckart

(10) Patent No.: US 8,660,139 B2
(45) Date of Patent: *Feb. 25, 2014

(54) SYSTEMS, METHODS AND COMPUTER PRODUCTS FOR POOLING OF WIRELESS COLLECTION BANDWIDTH

(75) Inventor: John Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 230 days.

This patent is subject to a terminal disclaimer.

(21) Appl. No.: 13/011,585

(22) Filed: Jan. 21, 2011

(65) Prior Publication Data
US 2011/0110324 A1    May 12, 2011

Related U.S. Application Data

(63) Continuation of application No. 11/837,927, filed on Aug. 13, 2007, now Pat. No. 7,894,470.

(51) Int. Cl.
*H04J 3/16*        (2006.01)
(52) U.S. Cl.
USPC ........................................................ 370/466
(58) Field of Classification Search
USPC ......... 370/464, 477, 351, 389, 395.1, 395.41,
370/395.4; 455/111, 114.01, 114.06,
455/114.07
See application file for complete search history.

(56) References Cited

U.S. PATENT DOCUMENTS

| | | | |
|---|---|---|---|
| 6,850,502 B1 | 2/2005 | Kagan et al. | |
| 7,003,313 B2 | 2/2006 | Garces et al. | |
| 7,860,081 B2 * | 12/2010 | Dawson et al. | 370/352 |
| 2005/0208949 A1 | 9/2005 | Chiueh | |
| 2006/0039367 A1 | 2/2006 | Wright et al. | |
| 2006/0041688 A1 | 2/2006 | Wright et al. | |
| 2006/0199567 A1 | 9/2006 | Alston | |
| 2007/0030857 A1 | 2/2007 | Fulknier et al. | |
| 2008/0298283 A1 * | 12/2008 | Dawson et al. | 370/310 |
| 2009/0034458 A1 | 2/2009 | Horn et al. | |

OTHER PUBLICATIONS

Blogrunner, [online]; [retrieved on Apr. 20, 2006] retrieved from the Internet http://annotatedtimes.blogrunner.com/snapshot/D/4/6/43CB4DE107E9E946/.
U.S. Official Action dated Jun. 28, 2010 in U.S. Appl. No. 11/837,927.
U.S. Notice of Allowance dated Oct. 20, 2010 in U.S. Appl. No. 11/837,927.

* cited by examiner

*Primary Examiner* — Fan Ng
(74) *Attorney, Agent, or Firm* — Hartman & Citrin LLC

(57) ABSTRACT

Systems, methods and computer products for pooling of wireless collection bandwidth. Exemplary embodiments include a bandwidth management method, in a wireless device, the method, including querying for additional wireless devices within a communication range of the wireless device, the wireless device and additional wireless devices being in communication with a network having downloadable content, initiating communication between the wireless device and the additional wireless devices, establishing an ad-hoc network among the combination of the wireless device and the additional devices, establishing communication between the combined wireless device and additional devices as the ad-hoc network, and the network having the downloadable content and requesting the downloadable content from the network to the wireless device, wherein the downloadable content is transferred over a bandwidth collectively pooled among individual bandwidths of the wireless device and the additional wireless devices.

18 Claims, 3 Drawing Sheets

SYSTEMS, METHODS AND COMPUTER PRODUCTS FOR POOLING OF WIRELESS COLLECTION BANDWIDTH

CROSS-REFERENCE TO RELATED APPLICATION

This is a continuation application of U.S. non-provisional application Ser. No. 11/837,927, now U.S. Pat. No. 7,894,470, entitled "Systems, Methods And Computer Products for Pooling of Wireless Collection Bandwidth," filed Aug. 13, 2007, the entire contents of which are incorporated by reference herein.

BACKGROUND

Exemplary embodiments relate generally to wireless phones, and more particularly, to systems, methods, and computer products for pooling of wireless collection bandwidth.

Wireless phones are becoming more and more sophisticated and capable of services beyond just voice. Internet access, gaming and even video are now possible on small portable devices. Also, wireless phones which traditionally use cell service such as CMDA, GSM, etc. are also capable of using alternative networks such as Wi-Fi or WiMax when they are available and are capable of switching back and forth between traditional and alternative networks. Unfortunately, current bandwidth access prohibits optimal performance of many of the newer services, such as video.

Mesh networking is a way to route data, voice and instructions between nodes. Mesh networking allows for continuous connections and reconfiguration around broken or blocked paths by "hopping" from node to node until the destination is reached. A mesh network whose nodes are all connected to each other is a fully connected network. Mesh networking is a subclass of mobile ad hoc networking (MANET). A MANET is a kind of wireless ad-hoc network and is a self-configuring network of mobile routers (and associated hosts) connected by wireless links—the union of which forms an arbitrary topology. The routers are free to move randomly and organize themselves arbitrarily; thus, the network's wireless topology may change rapidly and unpredictably. Such a network may operate in a standalone fashion, or may be connected to a larger network such as the Internet.

As discussed above, current bandwidth access prohibits optimal performance of many newer services such as downloading video content. There exists a need to improve access to bandwidth to provide enhanced downloading services to wireless devices such as cellular telephones.

BRIEF SUMMARY

Exemplary embodiments include a bandwidth management method, in a wireless device, the method, including querying for additional wireless devices within a communication range of the wireless device, the wireless device and additional wireless devices being in communication with a network having downloadable content, initiating communication between the wireless device and the additional wireless devices, establishing an ad-hoc network among the combination of the wireless device and the additional devices, establishing communication between the combined wireless device and additional devices as the ad-hoc network, and the network having the downloadable content and requesting the downloadable content from the network to the wireless device, wherein the downloadable content is transferred over a bandwidth collectively pooled among individual bandwidths of the wireless device and the additional wireless devices.

Additional exemplary embodiments include a system for managing bandwidth, the system including a wireless device and a collective bandwidth pooling application residing on the device, the collective bandwidth pooling application having instructions to monitor for additional wireless devices having bandwidth for bandwidth pooling with the wireless device.

Further exemplary embodiments include a computer-readable medium having computer-executable instructions for performing a bandwidth management method including querying for additional wireless devices within a communication range of a wireless device, the wireless device and additional wireless devices being in communication with a network having downloadable content, initiating communication between the wireless device and the additional wireless devices, establishing an ad-hoc network among the combination of the wireless device and the additional devices, establishing communication between the combined wireless device and additional devices as the ad-hoc network, and the network having the downloadable content and requesting the downloadable content from the network to the wireless device, wherein the downloadable content is transferred over a bandwidth collectively pooled among individual bandwidths of the wireless device and the additional wireless devices.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments include systems and methods that address bandwidth constraints by pooling data access channels of multiple accessible wireless devices using available data links, and pooling the data links of the multiple devices together via an ad-hoc network, such as an ad hoc WLAN. For example, if several wireless devices are within proximity of each other and one user wants to access a large download, the user's wireless device requiring access to a large download can link to the other wireless devices within proximity via a connection, such as a Wi-Fi connection, and utilize the collective bandwidth of the group of wireless devices to access the download. The effective bandwidth is then greater than any individual device. This functionality is particularly useful for areas where broadband data access is not available. The wireless devices could alternatively network using IMS, Bluetooth, Wi-Max or other wireless standards.

Figure 1:
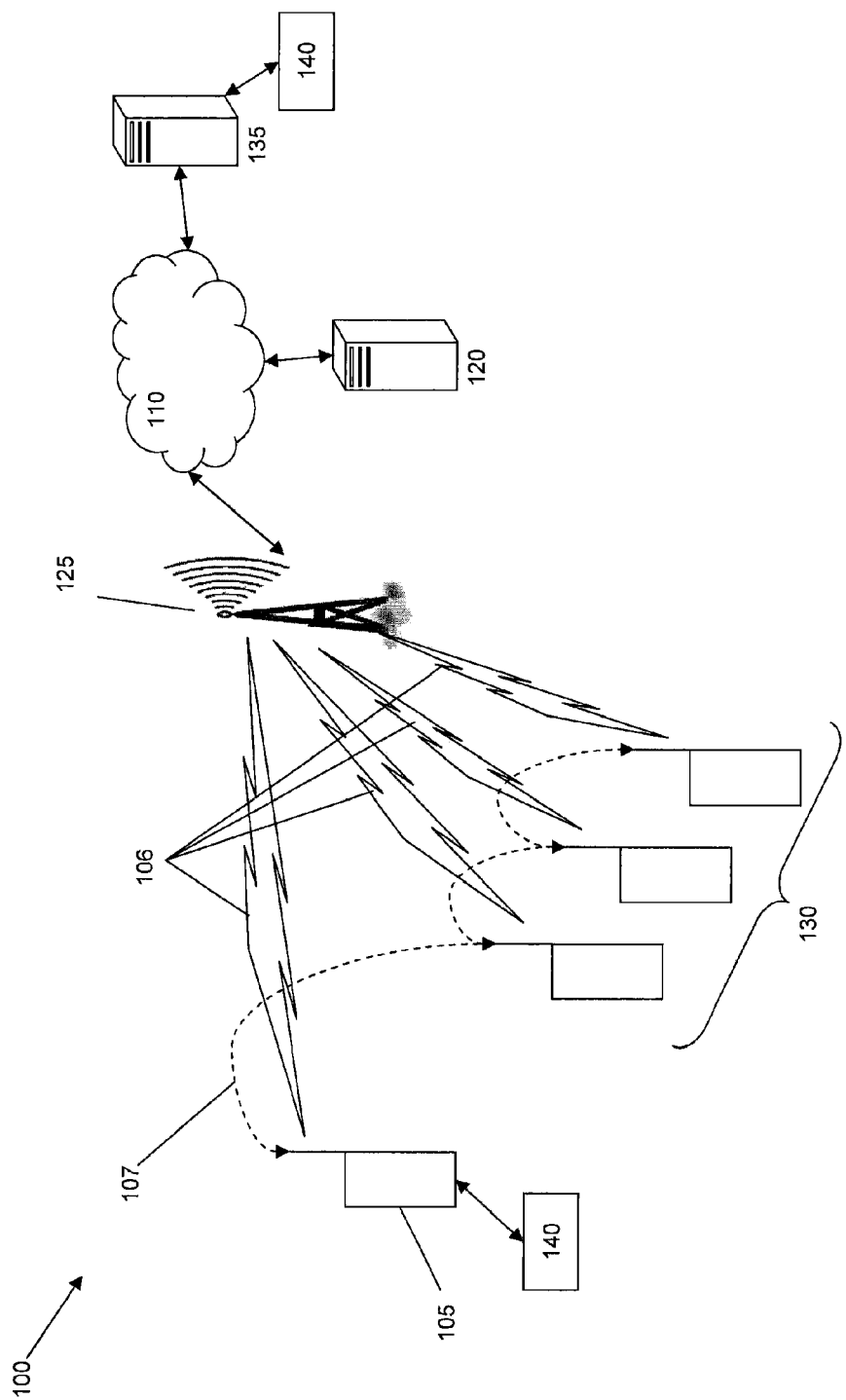
FIG. 1 illustrates a system for pooling of wireless collection bandwidth in accordance with exemplary embodiments.

FIG. 1 illustrates a system 100 for pooling of wireless collection bandwidth in exemplary embodiments. In general, system 100 includes a first wireless device 105 having an associated bandwidth that can be implemented to download content from a network 110. In exemplary embodiments, the first wireless device 105 can be a cellular telephone (e.g., a mobile phone, 3G cell phone, Wi-Fi phone, Wi-Max phone), a personal computer, a laptop computer, a portable computing device (e.g., personal digital assistant), a digital music player (e.g., MP3 player), etc.

The network 110 can be an IP-based network for communication between a content services provider server 120 and clients using communication devices such as but not limited to the first wireless device 105. The network 110 can be implemented to transmit content from the content services provider server 120 to clients having a wireless device, such as the first wireless device 105 via a broadband connection, for which increased bandwidth may be necessary. In exemplary embodiments, network 110 can be a managed IP network administered by a service provider, which can control bandwidth and quality of service for downloads, but as discussed, may only provide limited bandwidth for a device such as the first wireless device 105. However, as discussed below, the service provider may offer pooling of wireless collection bandwidth services. Network 110 can also be implemented in a wireless fashion, e.g., using wireless protocols and technologies, such as Wi-Fi, Wi-Max, etc. Network 110 can also be a cellular communications network, a fixed wireless network, a wireless local area network (LAN), a wireless wide area network (WAN), a personal area network (PAN), intranet, metropolitan area network, Internet network, or other similar type of network environment or other suitable network system and includes equipment for receiving and transmitting signals such as a cell tower 125 and a mobile switching center (MSC) (not shown). A home location register (HLR) (not shown) interacts with the MSC to perform subscriber management and call switching. The HLR, as is known in the art, includes a database of customer (subscriber) information including customer profiles utilized in mobile (cellular) networks. In another exemplary embodiment, network 110 can be a circuit-switched network such as a standard public switched telephone network (PSTN). The first wireless device 105 can be in communication with tower 125 through a variety of protocols 106 including but not limited to, EDGE, GPRS, EDVO, Wi-Fi, etc.

System 100 can further include additional wireless devices 130, for communication with network 110 and the first wireless device 105. It is appreciated that the additional wireless devices 130 can be a variety of exemplary wireless devices. In exemplary embodiments, the additional wireless devices 130 can be a cellular telephone (e.g., a mobile phone, 3G cell phone, Wi-Fi phone, Wi-Max phone), a personal computer, a laptop computer, a portable computing device (e.g., personal digital assistant), a digital music player (e.g., MP3 player), etc. In exemplary embodiments, as discussed further in the description below, the first wireless device 105 and the additional wireless devices 130 can be pooled together to increase the bandwidth for one or more of the devices. As such, in exemplary embodiments, the use of the pooled wireless devices 105, 130 for increased bandwidth forms a mesh network wherein each wireless device 105, 130 is a node in system 100. Each node can be implemented for a respective increase in bandwidth. In exemplary implementations, each wireless device 105, 130 is in communication with the network 110 independently of the other wireless devices 105, 130. Furthermore, the wireless devices 105, 130 can pool the respective bandwidth of some or all of the other wireless devices 105, 130 to increase bandwidth. Wireless devices 105, 130 may be in communication among themselves in a resulting ad-hoc network 107 with a variety of communications protocols including but not limited to WLAN, etc.

The first wireless device 105 can include a wireless collection bandwidth pooling application 140 for connection to the additional wireless devices 130 for the implementation of pooling of wireless collection bandwidth. The first wireless device 105 can include connection software such as a wireless application protocol (WAP) browser or a hypertext markup language (HTML) browser when a wireless collection bandwidth pooling application resides on an application server 135. Alternatively, the first wireless device 105 may include a Java client (e.g. J2ME, binary runtime environment for wireless (BREW), other similar client) or any other type of client known in the art when portions of the wireless collection bandwidth pooling application reside on the first wireless device 105. Other portions of the wireless collection bandwidth pooling application 140 can reside on the application server 135. The application server 135 can in turn execute one or more computer programs to facilitate the wireless collection bandwidth pooling application 140. The processing is described in more detail below and may include having all of the wireless collection bandwidth pooling applications residing on the server 135 or sharing the processing of the wireless collection bandwidth pooling application between the server 135 and the wireless devices 105, 130. As discussed, all or portions of the wireless collection bandwidth pooling application 140 may be located on the server 135 such as a wireless markup language (WML) or wireless application protocol (WAP) server, an HTML server, a Java application server, or a BREW application server. In exemplary embodiments, portions of the wireless collection bandwidth pooling application 140 may also be located on the wireless devices 105, 130.

In exemplary embodiments, the user of the first wireless device 105 may request to download content from the content services provider server 120 over the network 110. The content may be a game, a ring tone, images, a movie, etc. Although much downloaded content does not require bandwidth that exceeds the capability of the first wireless device 105, some content, such as movies, may exceed the capability of the first wireless device 105 due to an increased bandwidth requirement. As such, the transmission may not be able to continue due to the large bandwidth of the requested content. Therefore, the user can invoke the wireless collection bandwidth pooling application 140 so that the transmission can continue and/or can be accessed more efficiently. In exemplary embodiments, the invocation of the wireless collection bandwidth pooling application 140 is performed automatically without further action required of the user. Such wireless collection bandwidth pooling can include programming the wireless devices 105, 130 to create the ad-hoc network 107 based on bandwidth demand and availability.

In exemplary implementations, multiple users have agreed to share the bandwidth of their particular devices when in range and have further agreed that they would be able to use the bandwidth of other users' wireless devices when needed. In general, users of wireless devices, such as the wireless devices 105, 130, in the ad hoc network 107 may be unaware of other users' activities.

Figure 2:
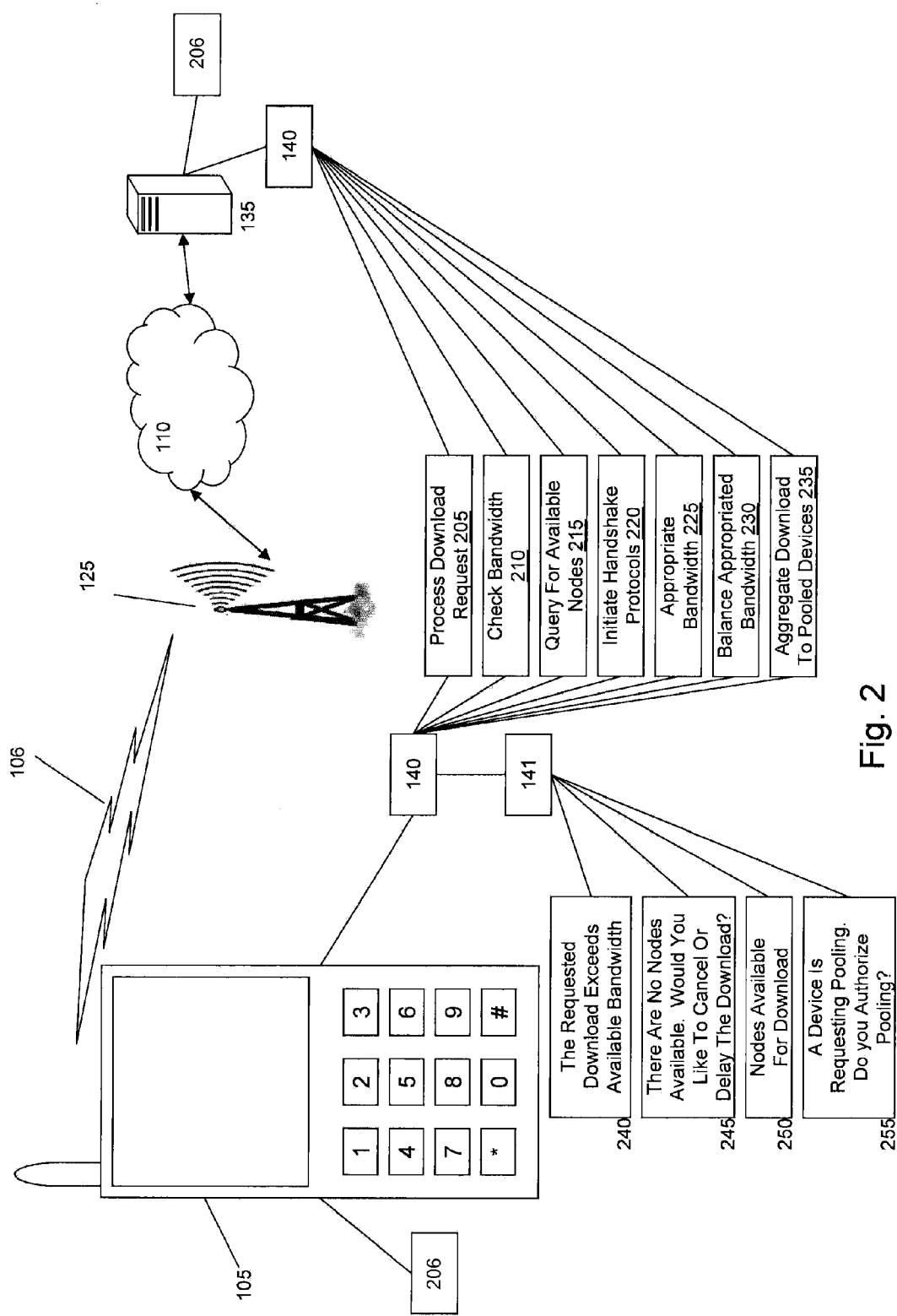
FIG. 2 depicts a first wireless device for providing pooling of wireless collection bandwidth in exemplary embodiments.

In exemplary embodiments, a respective wireless device 105, 130 can include a notification application 141, as depicted in FIG. 2, as part of the wireless collection bandwidth pooling application 140, which alerts the user that the wireless device's bandwidth is in use from another user's wireless device. Such a notification can be implemented to allow a particular user to disallow the use of the additional bandwidth in a case in which the particular user is in need of the bandwidth at a particular moment. For example, the wireless collection bandwidth pooling application 140 on a given wireless device can monitor bandwidth pooling periodically and notify the particular user if the user's bandwidth is being pooled. The application 140 can then further inquire whether or not the particular user wants to disallow the pooling. The user can then respond whether or not to disallow the pooling. If the user does disallow the pooling, then the particular wireless device associated with that user is removed as a node in the ad hoc network 107. In other exemplary implementations, the notification may occur if the particular user wants to download content. In such an instance, the user can be notified if any other device is using the user's device in a pooling application, thereby leaving little or no bandwidth for the user's download. As such, the user can wait or choose to be removed from the ad-hoc network 107. In other exemplary implementations, the wireless collection bandwidth pooling application 140 can manage multiple downloads in order to balance the pooled bandwidth so that each user in the ad-hoc network 107 can take advantage of the pooled bandwidth without having to disallow a particular pooling instance.

In exemplary embodiments, users in the ad-hoc network 107 can share downloaded content with each other. For example, multiple users, say a group of friends, could pool their wireless devices 105, 130 together in an ad-hoc network 107 to download particular content that would be otherwise unavailable for download due to limited bandwidth of any of any one wireless device 105, 130 individually. Once downloaded, the content could then be available to each of the wireless devices 105, 130 used to download the content. For example, the first wireless device 105 could pool the bandwidth of the additional wireless devices 130 to download a movie. Once downloaded, the first wireless device 105 could provide the movie to the additional wireless devices 130 over the ad hoc network 107. Alternatively, the wireless collection bandwidth pooling application 140 on each wireless device 105, 130 could manage the download once the application 140 is aware that each device 105, 130 has requested a common download. In such an instance, the download can commence sequentially for each device individually or simultaneously, with each device 105, 130 receiving content at once. It is appreciated that each of the wireless devices 105, 130 has each been authorized to receive the content from the content server 120 and that unauthorized downloading of the content is disallowed by the wireless collection bandwidth pooling application 140.

In general, it is appreciated that the wireless devices 105, 130 as network nodes can change often with handoffs and handshakes occurring frequently depending on the availability of wireless devices in the area that allow use of pooled bandwidth, and further depending on individual permissions of a given user to use the bandwidth, if applicable.

FIG. 2 depicts first wireless device 105 for providing pooling of wireless collection bandwidth in exemplary embodiments. As discussed above, the first wireless device 105 can include a wireless collection bandwidth pooling application 140 for connection to the additional wireless devices 130 for the implementation of pooling of wireless collection bandwidth. As discussed further below, the wireless collection bandwidth pooling application 140 can include one or more processes in order to manage bandwidth for a download. Such processes can include, but are not limited to: processing the download 205; checking for available bandwidth 210 on the first wireless device 105; querying for available nodes 215 when the first wireless device 105 does not have enough bandwidth to complete the download; initiating handshake protocols 220 with available nodes for a download; appropriating bandwidth 225 from the available nodes; balancing the appropriated bandwidth 230 across the nodes; and aggregating the download to the pooled devices (nodes) 235 if the pooled devices have also requested the downloaded content. The first wireless device 105 further includes the notification application 141, which can include various notification processes, including, but not limited to: informing the user that the requested download exceeds the available bandwidth 240 on the first wireless device 105; informing the user that there are no nodes available for the download, and prompting the user whether or not the user would like to cancel or delay the download 245; informing the user that there are nodes available for the download 250, either in response to a download request or as a follow-up to a delayed download request; and notifying the user that other devices are requesting the first wireless device 105 to be pooled for a download 255 on another device such as on one or more of the additional wireless devices 130. The notification process requesting that a device is requesting to pool 255 the first wireless device 105 can include a prompt requesting that the user either deny or approve the request. As further discussed above, the first wireless device 105 can include one or more connection software applications 206 including but not limited to a WAP browser, HTML browser, and a Java client.

Similarly, the application server 135 can include the wireless collection bandwidth pooling application 140, the notification application 141 and the connection software applications. As discussed, the applications 140, 141, 206 can reside wholly on either of the first wireless device 105 or the application server 135. Alternatively, the applications 140, 141, 206 can reside partially on both of the first wireless device 105 and the application server 135.

In further exemplary embodiments, once devices 105, 130 are pooled, the users can further be prompted if they would like to share personal information with one another. In this way, users of devices that have either intentionally pooled their devices can decide to share personal demographic information (e.g., name, phone number, and other contact information) with one another. Such information can be transferred among the devices via the ad-hoc network 107 or by other transfer protocols described herein.

Figure 3:
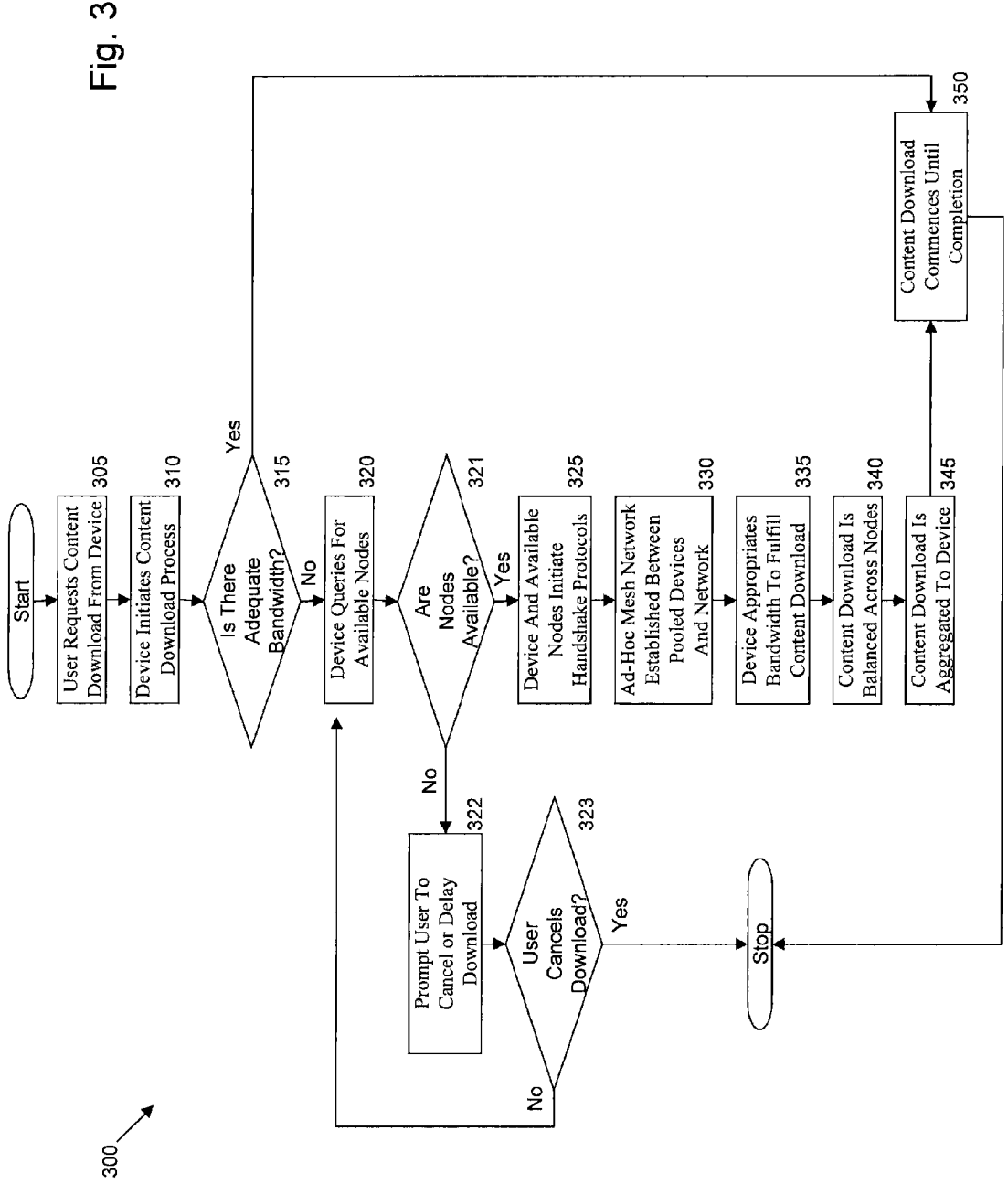
FIG. 3 illustrates a method for pooling of wireless collection bandwidth in accordance with exemplary embodiments.

FIG. 3 illustrates a method 300 for pooling of wireless collection bandwidth in accordance with exemplary embodiments. At step 305, a user can request a content download from the content server 120 over the network 110. At step 310, the first wireless device 105 initiates the content download. At step 315, the first wireless device 105 determines if there is adequate bandwidth to initiate and complete the download. It is appreciated that the first wireless device 105 can make this determination implementing the wireless collection bandwidth pooling application 140. If there is adequate bandwidth to support the content download, then the content download commences until completion at step 350. If, however, at step 315, the first wireless device 105 does not have adequate bandwidth to support the content download, then the first wireless device 105 queries for available nodes, or other existing ad-hoc networks at step 320. In general, the first wireless device 105 can query other local devices such as the additional wireless devices 130, as discussed above. It is understood that in other exemplary implementations, other types of available and proximate devices can be queried.

At step 321, the method 300 determines whether or not there are nodes available. If there are no nodes available at step 321, then at step 322, the user can be prompted that there are no nodes available, and whether or not the user wants to cancel the download or delay the download until there are nodes available. If the user cancels the download at step 323, then the flow ends. If the user delays the download at step 323, then the first wireless device 105 can continue to query for available nodes at step 320. It is appreciated that the querying of available nodes at step 320 and the subsequent steps can continue until available devices are detected. It is further appreciated that in other exemplary embodiments, the first wireless device 105 can eventually time-out if no available devices are detected within a pre-determined time period.

If at step 321, the method 300 detects that nodes are available, then at step 325, the first wireless device 105 and other available nodes, (e.g., the additional wireless devices 130, etc.) initiate connection protocols. In exemplary implementations, the connection protocols could be included in the wireless collection bandwidth pooling application 140. For example, the first wireless device 105 can link to the additional wireless devices 130 within proximity via a connection, such as a Wi-Fi connection. The wireless devices 105, 130 could alternatively network using IMS, Bluetooth, Wi-Max or other wireless standards for communication between wireless devices. In other exemplary embodiments, handshake protocols can be implemented among the devices 105, 130 to establish communication. For example, Challenge-Handshake Authentication Protocol (CHAP) applies a three-way handshaking procedure. After the link is established, the application sends a "challenge" message to the originator (e.g., the first wireless device 105). The originator responds with a value calculated using a one-way hash function. The application (e.g., the wireless collection bandwidth pooling application 140) checks the response against its own calculation of the expected hash value. If the values match, the authentication is acknowledged; otherwise the connection can be terminated.

Once the communication protocols are initiated and communications have been established among the devices 105, 130, at step 330, the ad-hoc mesh network 107 is established between the devices 105, 130 as a collectively pooled bandwidth network (i.e., ad-hoc network 107), and the network 110. It is therefore appreciated that, with respect to the network 110, the ad-hoc network 107 is established between the devices 105, 130, effectively as a single collective device with collective bandwidth via the wireless collection bandwidth pooling application 140. It is further appreciated that the devices 105, 130 may come and go into and out of the collective device because different users may come and go into and out of the vicinity in which the ad-hoc network 107 can be formed. In addition, devices 105, 130 may or may not receive notifications of being added to a collective pool depending on the settings on the users' devices 105, 130 as discussed above.

Regardless of the manner in which the additional wireless devices 130 are collectively pooled with the first wireless device 105, the first wireless device 105 then appropriates the necessary pooled bandwidth to fulfill the download request at step 335. It is appreciated that in other exemplary implementations, the first wireless device 105 via the wireless collection bandwidth pooling application 140 can constantly query for available devices in proximity in anticipation of a content download, but without actually having requested a content download. Therefore, steps 320, 325 and 330 can be performed constantly in anticipation of a content download and the ad-hoc network 107 can be constantly established upon the request for a content download from the user.

Regardless of the manner in which the ad-hoc network 107 is established, as the content download proceeds, the content download is balanced across the network nodes (i.e., the wireless devices 105, 130) as needed at step 340. It is therefore appreciated that the content download balancing can be dynamic if different devices are coming into and out of the ad-hoc network 107. For example, the wireless collection bandwidth pooling application 140 can determine which of the devices 105, 130 receive which packets and in what order. In addition, the wireless collection bandwidth pooling application 140 can further determine what types of re-balancing of the packets can occur in the event that one or more of the additional wireless devices 130 leaves the proximate area of the first wireless device 105 necessary to maintain the ad-hoc network 107. As such, the wireless collection bandwidth pooling application 140 further determines how the packets are to be assembled in the first wireless device 105 upon completion of the content download. Therefore, in exemplary embodiments, since the pooled devices 105, 130 are effectively a single device and since the wireless collection bandwidth pooling application 140 manages how the packets are received, the content server 120 can send the content over the network 110 as if the content server 120 were sending the content to a single wireless device.

At step 345, the content download is aggregated to the first wireless device 105 that is requesting the download for use or for storage. At step 350 the content download commences as managed by the wireless collection bandwidth pooling application 140 until completion of the content download. It is therefore appreciated that the wireless collection bandwidth pooling application 140 manages the assembly of the packets received in the first wireless device 105 and those packets received in the additional wireless devices 130 in the first wireless device 105. As discussed above, if the additional wireless devices 130 indicate that they also desired to receive the download, the download can be further aggregated into the first wireless device 105 requesting the download. The wireless collection bandwidth pooling application 140 can manage how the packets are assembled among the devices that requested the content download. As such, in an exemplary implementation, if one of the additional wireless devices 130 shares in the download, a notification can be sent to the content server 120 for appropriate billing.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method, comprising:
   receiving, at a server from a first wireless device, a request to download content from a content server, the first wireless device associated with a first bandwidth;
   determining, by the server, that the first bandwidth of the first wireless device is inadequate for supporting download of the content from the content server;
   in response to determining that the first bandwidth is inadequate, querying, by the server, for additional wireless devices within a communication range of the first wireless device;
   initiating, by the server, communication between the first wireless device and a second wireless device of the additional wireless devices to establish an ad-hoc network, the second wireless device associated with a second bandwidth;
   pooling, by the server, at least a portion of the first bandwidth of the first wireless device and at least a portion of the second bandwidth of the second wireless device to form a pooled bandwidth;
   appropriating, by the server, at least a portion of the pooled bandwidth to fulfill the request, from the first wireless device, to download the content from the content server, wherein the at least a portion of the pooled bandwidth is adequate for supporting download of the content from the content server; and
   when querying for additional wireless devices indicates no additional wireless devices are in the communication range, delaying, by the server, the request until additional wireless device are in the communication range.

2. The method of claim 1, further comprising initiating download of the content from the content server, wherein the content is transferred over the pooled bandwidth, and wherein the pooled bandwidth dynamically changes in response to the second wireless device leaving the communication range of the first wireless device and a third wireless device coming within the communication range of the first wireless device.

3. The method of claim 2, wherein a first portion of the content is downloaded to the first wireless device and a second portion of the content is downloaded to the second wireless device.

4. The method of claim 3, further comprising assembling, at the first wireless device that requested to download the content, the second portion of the content downloaded to the second wireless device with the first portion of the content downloaded to the first wireless device.

5. The method of claim 1, further comprising determining how to rebalance download of the content if the second wireless device exits the communication range of the first wireless device.

6. The method of claim 1, further comprising:
   providing a notification to the second wireless device that the first wireless device is requesting use of at least a portion of the second bandwidth of the second wireless device to download the content from the content server; and
   providing an option to the second wireless device to approve or deny the use of at least a portion of the second bandwidth of the second wireless device to download the content from the content server.

7. The method of claim 1, further comprising providing a prompt to the first wireless device and the second wireless device to share personal information between the first wireless device and the second wireless device.

8. The method of claim 4, further comprising after assembling the second portion of the content and the first portion of the content at the first wireless device, providing the content from the first wireless device to the second wireless device.

9. The method of claim 8, further comprising providing a notification to the content server that the content has been provided to the second wireless device.

10. A non-transitory computer-readable medium storing computer-executable instructions that, when executed by a processor, cause the processor to perform operations comprising:
    receiving a request to download content from a content server, the first wireless device associated with a first bandwidth;
    determining that the first bandwidth of the first wireless device is inadequate for supporting download of the content from the content server;
    in response to determining that the first bandwidth is inadequate, querying for additional wireless devices within a communication range of the first wireless device;
    initiating communication between the first wireless device and a second wireless device of the additional wireless devices to establish an ad-hoc network, the second wireless device associated with a second bandwidth;
    pooling at least a portion of the first bandwidth of the first wireless device and at least a portion of the second bandwidth of the second wireless device to form a pooled bandwidth;
    appropriating at least a portion of the pooled bandwidth to fulfill the request, from the first wireless device, to download the content from the content server, wherein the at least a portion of the pooled bandwidth is adequate for supporting download of the content from the content server; and
    when querying for additional wireless devices indicates no additional wireless devices are in the communication range, delaying the request until additional wireless device are in the communication range.

11. The non-transitory computer-readable medium of claim 10, wherein the operations further comprise initiating download of the content from the content server, wherein the content is transferred over the pooled bandwidth, and wherein the pooled bandwidth dynamically changes in response to the second wireless device leaving the communication range of the first wireless device and a third wireless device coming within the communication range of the first wireless device.

12. The non-transitory computer-readable medium of claim 11, wherein a first portion of the content is downloaded to the first wireless device and a second portion of the content is downloaded to the second wireless device.

13. The non-transitory computer-readable medium of claim 12, wherein the operations further comprise assembling, at the first wireless device that requested to download the content, the second portion of the content downloaded to the second wireless device with the first portion of the content downloaded to the first wireless device.

14. The non-transitory computer-readable medium of claim 10, further comprising determining how to rebalance download of the content if the second wireless device exits the communication range of the first wireless device.

15. The non-transitory computer-readable medium of claim 10, wherein the operations further comprise:
   providing a notification to the second wireless device that the first wireless device is requesting use of at least a portion of the second bandwidth of the second wireless device to download the content from the content server; and
   providing an option to the second wireless device to approve or deny the use of at least a portion of the second bandwidth of the second wireless device to download the content from the content server.

16. The non-transitory computer-readable medium of claim 10, wherein the operations further comprise providing a prompt to the first wireless device and the second wireless device to share personal information between the first wireless device and the second wireless device.

17. The non-transitory computer-readable medium of claim 13, wherein the operations further comprise:
   after assembling the second portion of the content and the first portion of the content at the first wireless device, providing the content from the first wireless device to the second wireless device; and
   providing a notification to the content server that the content has been provided to the second wireless device.

18. A first wireless device, comprising:
a processor; and
a computer-readable storage medium storing instructions that, when executed by the processor, cause the processor to perform operations comprising:
   receiving a request to download content from a content server, the first wireless device associated with a first bandwidth,
   determining that the first bandwidth of the first wireless device is inadequate for supporting download of the content from the content server,
   in response to determining that the first bandwidth is inadequate, querying for additional wireless devices within a communication range of the first wireless device;
   initiating communication between the first wireless device and a second wireless device of the additional wireless devices to establish an ad-hoc network, the second wireless device associated with a second bandwidth,
   pooling at least a portion of the first bandwidth of the first wireless device and at least a portion of the second bandwidth of the second wireless device to form a pooled bandwidth,
   appropriating at least a portion of the pooled bandwidth to fulfill the request, from the first wireless device, to download the content from the content server, wherein the at least a portion of the pooled bandwidth is adequate for supporting download of the content from the content server, and
   when querying for additional wireless devices indicates no additional wireless devices are in the communication range, delaying the request until additional wireless device are in the communication range.

* * * * *